(12) United States Patent
Kobayashi

(10) Patent No.: US 8,927,161 B2
(45) Date of Patent: Jan. 6, 2015

(54) FUEL CELL SYSTEM

(75) Inventor: Tomoyoshi Kobayashi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 534 days.

(21) Appl. No.: 12/744,979

(22) PCT Filed: May 19, 2009

(86) PCT No.: PCT/JP2009/059159
§ 371 (c)(1),
(2), (4) Date: May 27, 2010

(87) PCT Pub. No.: WO2009/142185
PCT Pub. Date: Nov. 26, 2009

(65) Prior Publication Data
US 2010/0323252 A1   Dec. 23, 2010

(30) Foreign Application Priority Data

May 20, 2008   (JP) .................................. 2008-131633

(51) Int. Cl.
*H01M 8/06*   (2006.01)
*H01M 8/04*   (2006.01)
*H01M 8/10*   (2006.01)

(52) U.S. Cl.
CPC ...... *H01M 8/04097* (2013.01); *H01M 8/04201* (2013.01); *H01M 8/04388* (2013.01); *H01M 8/04425* (2013.01); *H01M 8/04753* (2013.01); *H01M 8/04761* (2013.01); *H01M 2008/1095* (2013.01); *Y02E 60/50* (2013.01)
USPC .......................................................... 429/415

(58) Field of Classification Search
CPC .................... H01M 8/04761; H01M 8/04425; H01M 8/04753
USPC .................... 429/415, 408–427, 512–516, 34
See application file for complete search history.

(56) References Cited

U.S. PATENT DOCUMENTS

2003/0096145 A1* 5/2003 Sugawara et al. ................ 429/22
2006/0073363 A1* 4/2006 Taniguchi et al. .............. 429/12

FOREIGN PATENT DOCUMENTS

| DE | 102 53 944 A1 | 7/2003 |
| JP | 2001-266922 A | 9/2001 |
| JP | 2003-017101 A | 1/2003 |
| JP | 2003-151588 A | 5/2003 |
| JP | 2006-099993 A | 4/2006 |

* cited by examiner

*Primary Examiner* — Nicholas P D'Aniello
(74) *Attorney, Agent, or Firm* — Kenyon & Kenyon LLP

(57) ABSTRACT

A fuel cell system including an ejector that merges a hydrogen gas to be supplied from a hydrogen tank to a fuel cell with a hydrogen-off gas exhausted from the fuel cell and supplies the resulting gases to the fuel cell. A hydrogen pump that pressurizes the hydrogen-off gas in a hydrogen circulation flow path and sends the hydrogen-off gas toward a hydrogen supply flow path and a control unit that controls, when the pressure of the hydrogen-off gas in the hydrogen circulation flow path is increased by the ejector and the hydrogen pump, the pressure of the hydrogen gas to be supplied to the ejector and the pressure increase of the hydrogen-off gas realized by the hydrogen pump so that the pressure increase of the hydrogen-off gas realized by the ejector is 0 or higher.

8 Claims, 2 Drawing Sheets

FUEL CELL SYSTEM

This is a 371 national phase application of PCT/JP2009/059159 filed 19 May 2009, which claims priority to Japanese Patent Application No. 2008-131633 filed 20 May 2008, the contents of which are incorporated herein by reference.

FIELD OF THE INVENTION

The present invention relates a fuel cell system.

BACKGROUND OF THE INVENTION

A fuel cell system generates electrical power through an electrochemical reaction between a fuel gas supplied to an anode and an oxidant gas supplied to a cathode. A fuel-off gas exhausted from the anode is returned to a fuel supply flow path via a fuel circulation flow path, mixed with the fuel gas supplied from a fuel supply source, and supplied to the anode again. In the fuel cell system disclosed in Patent Document 1 below, a fuel-off gas exhausted to a fuel circulation flow path is returned to a fuel supply path using a fuel pump and an ejector, and then mixed then with a fuel gas.

Since the fuel pump circulates a fuel using electricity, while the fuel pump is able to rapidly respond to variations of a load, the power consumption increases in an operation region where efficiency is lowered. The ejector can circulate the fuel using the pressure energy of the fuel gas, but it is difficult for the ejector to respond to rapid variations of the load due to a response delay in a nozzle. In light of such circumstances, in Patent Document 1 below, the fuel cell system is provided with both a fuel pump and an ejector, so that the ejector covers an operation region where the efficiency of the fuel pump is lowered and the power consumption is increased.

PRIOR ART REFERENCE

Patent Document

Patent Document 1: Japanese laid-open patent publication No. 2003-151588 A

SUMMARY OF THE INVENTION

Problem to be Solved by the Invention

In a fuel cell system which has: a fuel pump in a fuel circulation flow path; and an ejector at a point of merge, downstream the fuel pump, between the fuel circulation flow path and a fuel supply flow path, when a pressure increase ratio for a fuel-off gas between the ejector and the fuel pump is designed, the performance of the ejector should be sufficiently considered. This is because the performance of the ejector has a peak, and the efficiency will be lowered when the performance deviates from the peak, and the pressure of the fuel-off gas will even be reduced by the ejector when the performance deviates far from the peak. In other words, a part of the pressure of the fuel-off gas which has been increased by the fuel pump will be lost unless the pressure increase ratio is designed with the performance of the ejector taken into account. In addition, for example, in the situation where the performance of the ejector is low, even if the pressure increase ratio is designed with the performance of the ejector taken into account, the pressure of the fuel-off gas may be reduced in a part of load regions. In such a situation, the performance of the ejector needs to be adjusted. Accordingly, in order to efficiently increase the pressure of the fuel-off gas in the fuel cell system having the ejector downstream the fuel pump, it is necessary to make a design while adjusting the performance of the ejector and the pressure increase ratio for the fuel-off gas between the ejector and the fuel pump, so that the pressure of the fuel-off gas can be prevented from being reduced by the ejector.

Patent Document 1 above discloses that the ejector is operated in a high load region of the fuel cell while the fuel pump is operated in a low load region of the fuel cell (see FIG. 13 in Patent Document 1). However, Patent Document 1 merely discloses the priority of operation in the low load region and in the high load region. Patent Document 1 discloses nothing about the performance of the ejector and the pressure increase ratio between the ejector and the fuel pump. Accordingly, in the fuel cell system in Patent Document 1, a part of the pressure of the fuel-off gas which has been increased by the fuel pump will be lost in the ejector with certain performances of the ejector or with certain pressure increase ratios between the ejector and fuel pump. Possible solutions for preventing such a problem would be, for example, to additionally provide a bypass flow path for bypassing the ejector or fuel pump, or to provide an additional flow path and provide the ejector and fuel pump in respective different flow paths. However, the addition of such configurations complicates the system.

In order to solve the above problems in the related art, an object of the present invention is to provide, in fuel cell systems having an ejector downstream a fuel pump, a fuel cell system capable of efficiently increasing the pressure of a fuel-off gas with a simple configuration.

In order to achieve the object above, a fuel cell system according to an aspect of the present invention includes: a fuel cell that is supplied with an oxidant gas and a fuel gas as reactant gas and generates electrical power through an electrochemical reaction between the reactant gas; a fuel supply flow path that supplies the fuel gas from a fuel supply source to the fuel cell; an ejector that is provided in the fuel supply flow path, the ejector merging the fuel gas supplied from the fuel supply source with a fuel-off gas exhausted from the fuel cell and supplying the resulting gases to fuel cell; a pressure regulating valve that is provided upstream the ejector in the fuel supply flow path, the pressure regulating valve regulating a pressure of the fuel gas to be supplied to the ejector; a fuel circulation flow path that returns the fuel-off gas to the fuel gas supply flow path via the ejector; a fuel pump that is provided in the fuel circulation flow path, the fuel pump pressurizing the fuel-off gas in the fuel circulation flow path and sending the fuel-off gas toward the fuel supply flow path; and a control means that controls, when a pressure of the fuel-off gas in the fuel circulation flow path is increased by the ejector and the fuel pump, a pressure of the fuel gas to be supplied to the ejector and a pressure increase of the fuel-off gas realized by the fuel pump so that a value of the pressure increase of the fuel-off gas realized by the ejector is 0 or higher.

With such a configuration, when the pressure of the fuel-off gas is increased by the ejector and the fuel pump in the fuel cell system which has: the fuel pump in the fuel circulation flow path; and the ejector at a point of merge, downstream the fuel pump, between the fuel circulation flow path and the fuel supply flow path, the pressure of the fuel gas to be supplied to the ejector and the pressure increase of the fuel-off gas realized by the fuel pump can be controlled so that the value of pressure increase of the fuel-off gas realized by the ejector is 0 or higher. Accordingly, a part of the pressure of the fuel-off gas which has been increased by the fuel pump can be prevented from being lost in the ejector, and thus the pressure of the fuel-off gas can be efficiently increased by the ejector and the fuel pump. In addition, since there is no need for providing an additional flow path such as a bypass flow path, the configuration of the system can be simplified.

In the fuel cell system above: the control means may control, when the pressure of the fuel-off gas is increased by the ejector and the fuel pump, the pressure of the fuel gas to be supplied to the ejector and the pressure increase of the fuel-off gas realized by the fuel pump in accordance with a pressure increase ratio between the ejector and the fuel pump with respect to a value of a required pressure increase of the fuel-off gas; and the pressure increase ratio of the ejector may be set within a predetermined range which is set in accordance with an operation state of the fuel cell.

With such a configuration, since the pressure increase control for the fuel-off gas can be performed in accordance with the pressure increase ratio between the ejector and the fuel pump which has been set in accordance with the operation state of the fuel cell, the pressure of the fuel-off gas can be efficiently increased in accordance with the operation state.

In the fuel cell system above, a lower limit of the predetermined range may have a relationship of: the lower limit value when the operation state of the fuel cell is a first load state<the lower limit value when the operation state of the fuel cell is a second load state<the lower limit value when the operation state of the fuel cell is a third load state. Also, in the fuel cell system above, an upper limit of the predetermined range has a relationship of: the upper limit value when the operation state of the fuel cell is a first load state<the upper limit value when the operation state of the fuel cell is a second load state<the upper limit value when the operation state of the fuel cell is a third load state.

In the fuel cell system above, the predetermined range may be a range where the pressure increase ratio of the ejector is 50% or lower when the operation state of the fuel cell is the first load state, the predetermined range may be a range where the pressure increase ratio of the ejector is between 20 and 75% when the operation state of the fuel cell is the second load state which has a higher load than the first load state, and the predetermined range may be a range where the pressure increase ratio of the ejector is 40% or higher when the operation state of the fuel cell is the third load state which has a higher load than the second load state.

With such a configuration, the ejector is operated in a suppressed level so as not to impede the pressure increase realized by the fuel pump in the low load region of the fuel cell, while the utilization of the ejector is enhanced so as to assist the fuel pump in the high load region of the fuel cell.

In the fuel cell system above, the first load state may be a load state where an amount of power generation required from the fuel cell is 50% or lower of an amount of allowable power generation of the fuel cell, the second load state may be a load state where the amount of power generation required from the fuel cell is between 30 and 80% of the amount of allowable power generation of the fuel cell, and the first load state may be a load state where an amount of power generation required from the fuel cell is 60% or higher of the amount of allowable power generation of the fuel cell.

In the fuel cell system above, the ejector may be an ejector having a constant nozzle diameter, so that the configuration of the system can be simplified.

The present invention enables, in the fuel cell system having the ejector downstream the fuel pump, the pressure of the fuel-off gas to be efficiently increased with a simple configuration.

BEST MODE FOR CARRYING OUT THE INVENTION

Preferred embodiments of a fuel cell system according to the present invention will be described below with reference to the attached drawings. Each embodiment will describe an example where the fuel cell system according to the present invention is used as an in-vehicle power generation system for a fuel cell hybrid vehicle (FCHV).

Figure 1:
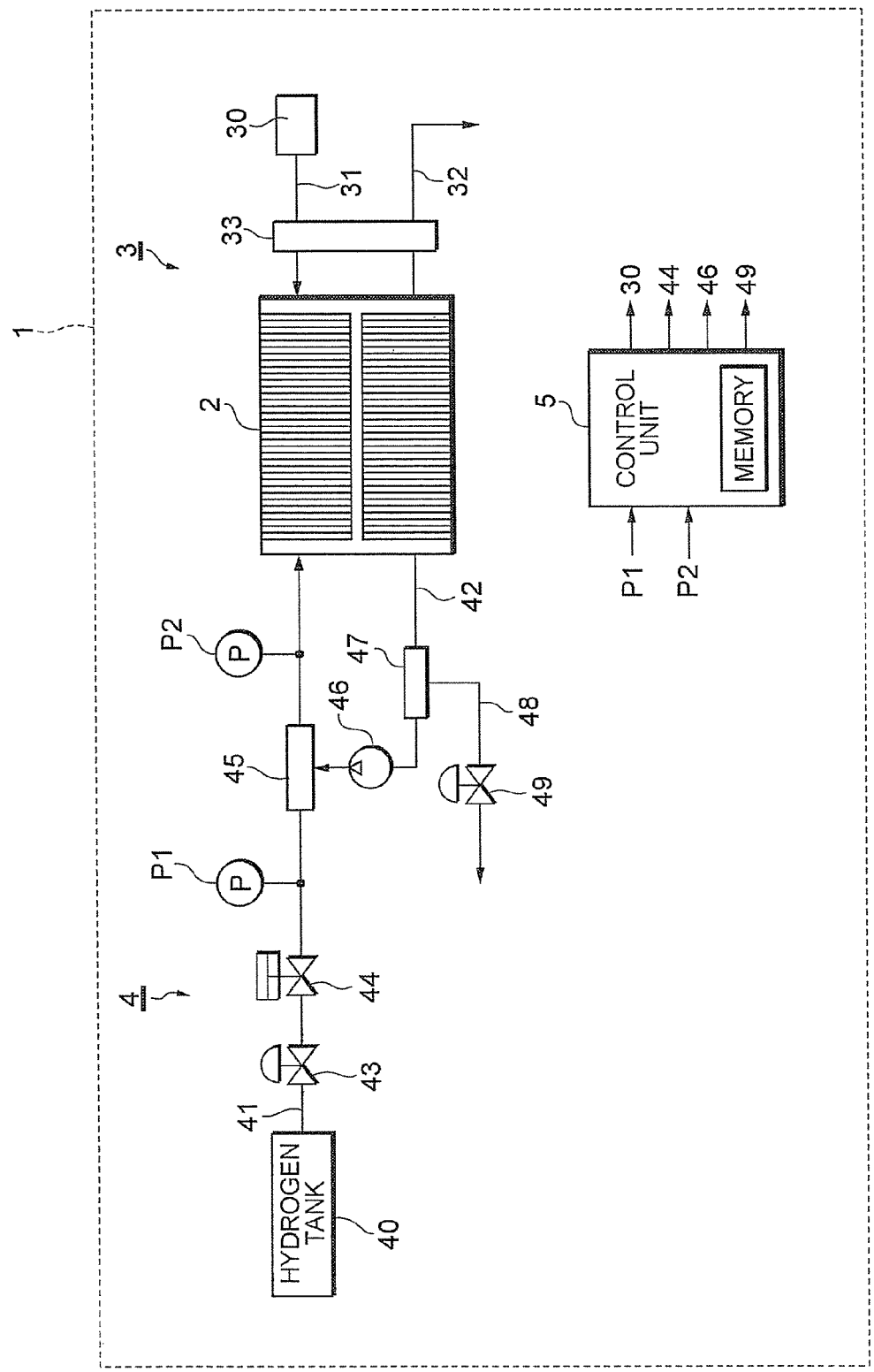
FIG. 1 is a configuration diagram schematically showing a fuel cell system in an embodiment.

First, the configuration of a fuel cell system in an embodiment will be described. FIG. 1 is a configuration diagram schematically showing the fuel cell system.

As shown in FIG. 1, the fuel cell system 1 includes: a fuel cell 2 that is supplied with an oxidant gas and a fuel gas as reactant gas and generates electrical power through an electrochemical reaction; an oxidant gas piping system 3 that supplies the air as the oxidant gas to the fuel cell 2; a hydrogen gas piping system 4 that supplies a hydrogen gas as the fuel gas to the fuel cell 2; and a control unit 5 that centrally controls the entire system.

The fuel cell 2 is, for example, a polymer electrolyte fuel cell and has a stack structure in which a lot of unit cells are stacked. The unit cells each have a cathode on one surface an electrolyte constituted from an ion-exchange membrane and an anode on the other surface of the electrolyte. The unit cell further includes a pair of separators which sandwich the anode and the cathode therebetween. In this configuration, the hydrogen gas is supplied to a hydrogen gas flow path in one separator, while the oxidant gas is supplied to an oxidant gas flow path in the other separator, and these reactant gas chemically react with each other to generate electrical power.

The oxidant gas piping system 3 includes: a compressor 30 that introduces the oxidant gas from the atmosphere, compresses the oxidant gas and then sends out the compressed gas; an air supply flow path 31 for supplying the oxidant gas to the fuel cell 2; and an air exhaust flow path 32 for exhausting the oxidant-off gas exhausted from the fuel cell 2. The air supply flow path 31 and the air exhaust flow path 32 are provided with a humidifier 33 for humidifying the air compressed and sent by the compressor 30 using the oxidant-off gas exhausted from the fuel cell 2. After being subjected to the moisture exchange in the humidifier 33, the oxidant-off gas is finally exhausted to the atmosphere outside the system as an exhaust gas.

The hydrogen gas piping system 4 includes: a hydrogen tank (fuel supply source) 40 that reserves a high-pressure hydrogen gas; a hydrogen supply flow path (fuel supply path) 41 for supplying the hydrogen gas in the hydrogen tank 40 to the fuel cell 2; and a hydrogen circulation flow path (fuel circulation flow path) 42 for returning a hydrogen-off gas exhausted from the fuel cell 2 to the hydrogen supply flow path 41. The hydrogen supply flow path 41 is provided with, in order from the upstream: a regulator 43 for regulating the pressure of the hydrogen gas to a preset secondary pressure; a pressure regulating valve 44 for regulating the amount of supply of the hydrogen gas (the pressure of hydrogen gas);

and an ejector 45 for returning the hydrogen-off gas in the hydrogen circulation flow path 42 to the hydrogen supply flow path 41.

The ejector 45 merges the hydrogen gas supplied from the hydrogen tank 40 with the hydrogen-off gas exhausted from the fuel cell 2, and supplies the mixed gas after the merge to the fuel cell 2. The ejector 45 in this embodiment is an ejector having a constant nozzle diameter. In the ejector 45, a nozzle provided at an inlet port injects the hydrogen gas supplied from the hydrogen tank 40 toward a diffuser, thereby generating a negative pressure in the diffuser. Using this negative pressure, the hydrogen-off gas is sucked into the diffuser from a suction port, where the sucked hydrogen-off gas and the hydrogen gas injected from the nozzle are mixed and then exhausted from an outlet port.

In the hydrogen supply flow path 41, pressure sensors P1 and P2 for detecting the pressure of the hydrogen gas are arranged respectively at the inlet port side and outlet port side of the ejector 45. The pressure sensor P1 detects the pressure of the hydrogen gas in the hydrogen supply flow path 41 between the pressure regulating valve 44 and the ejector 45. The pressure sensor P2 detects the pressure of the hydrogen gas in the hydrogen supply flow path 41 between the ejector 45 and the fuel cell 2.

The hydrogen circulation flow path 42 is provided with a hydrogen pump (fuel pump) 46 that pressurizes the hydrogen-off gas in the hydrogen circulation flow path 42 in order to send the hydrogen-off gas toward the hydrogen supply flow path 41. The hydrogen circulation flow path 42 is connected to an exhaust flow path 48 via a gas-liquid separator 47. The gas-liquid separator 47 collects moisture from the hydrogen-off gas. The exhaust flow path 48 is provided with a gas-and-water purge valve 49. In order to purge moisture collected in the gas-liquid separator 47 and the hydrogen-off gas containing impurities in the hydrogen circulation flow path 42, the gas-and-water purge valve 49 is usually closed and opened in accordance with a command from the control unit 5.

The control unit 5 detects the amount of operation of an acceleration member (e.g., accelerator pedal) provided in a fuel cell hybrid vehicle and controls the operations of various appliances in the system upon the receipt of control information such as a required acceleration value (e.g., the amount of power generation required by power-consuming apparatuses such as a traction motor). Note that examples of the power-consuming apparatuses include, in addition to the traction motor: auxiliary apparatuses required for operating the fuel cell 2 (e.g., motors for the compressor 30 and the hydrogen pump 46); actuators used in various apparatuses relevant to the travel of the vehicle (e.g., a speed change gear, a wheel control apparatus, a steering gear and a suspension); and an air-conditioning apparatus (air conditioner), lighting equipment and an audio system in a passenger compartment.

The control unit (control means) 5 controls the pressure of the hydrogen gas to be supplied to the ejector 45 and the pressure increase of the hydrogen-off gas realized by the hydrogen pump 46 so that the value of pressure increase of the hydrogen-off gas realized by the ejector 45 becomes 0 or higher, when the pressure of the hydrogen-off gas in the hydrogen circulation flow path 42 is increased by the ejector 45 and hydrogen pump 46 (hereinafter referred to as a pressure increase control for the hydrogen-off gas).

Specifically, when making the pressure increase control for the hydrogen-off gas, the control unit 5 controls the pressure of the hydrogen gas to be supplied to the ejector 45 and the pressure increase of the hydrogen-off gas realized by the hydrogen pump, in accordance with the pressure increase ratio between the ejector 45 and the hydrogen pump 46 with respect to the value of a required pressure increase of a hydrogen-off gas required from the fuel cell system. The pressure increase ratio is set so as to be within a predetermined range which has been set in accordance with loads on the fuel cell 2. The predetermined range refers to the range of pressure increase ratio which can ensure that the value of pressure increase of the hydrogen-off gas realized by the ejector 45 is 0 or higher in all load regions of the fuel cell. The predetermined range can be set as follows.

When a load on the fuel cell 2 is low (first load state), the predetermined range refers to a range where the pressure increase ratio of the ejector 45 is between 0 and 50%, in other words, the pressure increase ratio of the hydrogen pump 46 is between 50 and 100%. When the load is in the middle degree (second load state), the predetermined range refers to a range where the pressure increase ratio of the ejector 45 is between 20 and 75%, in other words, the pressure increase ratio of the hydrogen pump 46 is between 25 and 80%. When the load is high (third load state), the predetermined range refers to a range where the pressure increase ratio of the ejector 45 is between 40 and 100%, in other words, the pressure increase ratio of the hydrogen pump 46 is between 0 and 60%.

By setting the ratio of pressure increase shared by the ejector 45 and the hydrogen pump 46 so as to be within the above predetermined ranges of the loads on the fuel cell 2, the ejector 45 can be operated in a suppressed level so as not to impede the pressure increase by the hydrogen pump 46 in the low load region, while the utilization of the ejector 45 can be enhanced so as to assist the hydrogen pump 46 in the high load region.

Figure 2:
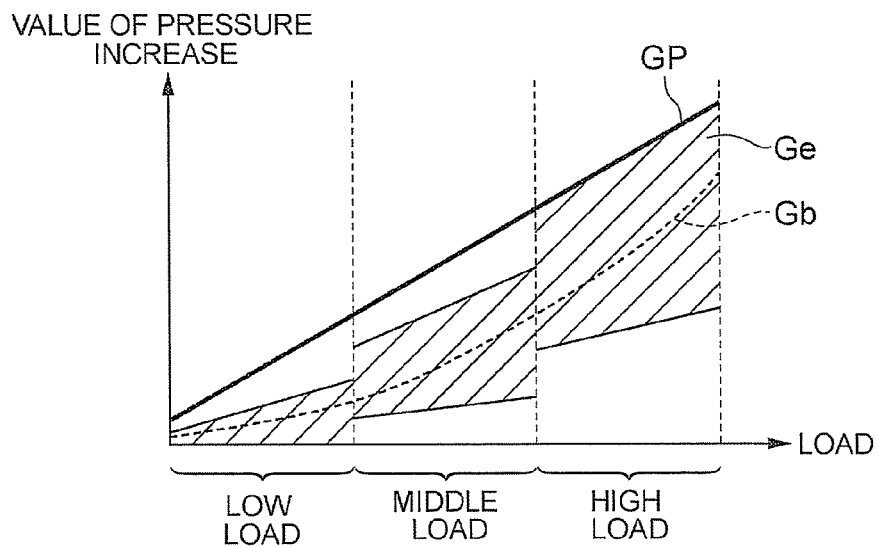
FIG. 2 is a graph showing the relationship between a load on a fuel cell and the value of a required pressure increase of a hydrogen-off gas.

Such a feature is expressed by the graph in FIG. 2 which shows the relationship between the load on the fuel cell and the value of a required pressure increase of the hydrogen-off gas required from the fuel cell system. The solid line Gp shows the transition of the value of a required pressure increase of the hydrogen-off gas required from the fuel cell system in accordance with the loads. The shaded parts Ge correspond to the predetermined ranges above.

The dashed line Gb shows an example of a pressure increase ratio. In this example, the area below the dashed line Gb in the area enclosed with the solid line Gp and the horizontal axis shows an area indicating the pressure increase handled by the ejector 45, while the area above the dashed line Gb in the area enclosed with the solid line Gp and the horizontal axis indicates the pressure increase handled by the hydrogen pump 46.

Here, some ejectors 45 cannot realize the pressure increase ratio Gb within the predetermined range Ge due to their performances. This is because the performance of an ejector depends on, for example, the diameters of a nozzle and a diffuser as well as the length of the diffuser, and some ejectors may not be able to increase the pressure in accordance with the set pressure increase ratio due to such physical factors. In such a situation, the diameters of the nozzle and diffuser, the length of the diffuser, etc., need to be adjusted, so that the ejector 45 can increase the pressure in accordance with the pressure increase ratio.

Figure 3:
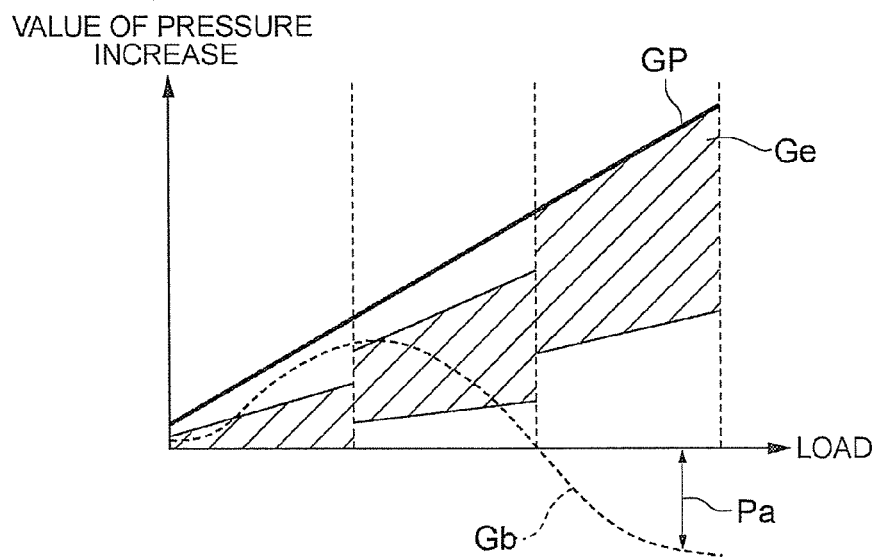
FIG. 3 is a graph showing the relationship between a load on a fuel cell and the value of a required pressure increase of a hydrogen-off gas.

However, even if the ejector 45 is adjusted, the range where the ejector can operate efficiently is limited, and thus it is difficult to have the ejector 45 efficiently cover all the load regions in the fuel cell. For example, as shown in FIG. 3, when the peak of the ejector 45 is set to be in the low load region side, the pressure of the hydrogen-off gas may be reduced by the ejector 45 in the high load region. Similarly, when the peak of the ejector 45 is set to the high load region side, the pressure of the hydrogen-off gas may be reduced by the ejector 45 in the low load region. In such situations, the hydrogen pump 46 alone has to increase the pressure, which includes the pressure having been reduced by the ejector 45 (the part Pa shown in FIG. 3), to the value of a required pressure increase value Gp, and therefore large electrical power needs to be consumed, which lowers the efficiency.

In view of the circumstances above, the inventors of the present application have focused on the fact that, if the pressure of the hydrogen gas to be supplied to the ejector can be increased, the pressure increase realized by the ejector can be enhanced even in the region where the efficiency of the ejector is lowered, and have conducted many experiments. As a result, the inventors have found that, by controlling the pressure of the hydrogen gas to be supplied to the ejector 45 and the pressure increase of the hydrogen-off gas realized by the hydrogen pump 46 so that the pressure increase ratio Gb is within the above-described predetermined range Ge in FIG. 2, the pressure of the hydrogen-off gas can be prevented from being reduced by the ejector 45.

In other words, the inventors have found that the value of pressure increase the hydrogen-off gas realized by the ejector 45 can be maintained at 0 or higher by making suitable adjustments to the performance of the ejector 45, and then setting the pressure increase ratio Gb between the ejector 45 and the hydrogen pump 46 within the predetermined range Ge and performing the pressure increase control for the hydrogen-off gas in accordance with the pressure increase ratio Gb.

Note that, as shown in FIG. 2, the lower limit of each predetermined range Ge which is set in accordance with the loads on the fuel cell 2 has the relationship of: "the lower limit during the low load<the lower limit during the middle load<the lower limit during the high load." Also, the upper limit of each predetermined range Ge which is set in accordance with the loads on the fuel cell 2 has the relationship of: "the upper limit during the low load<the upper limit during the middle load<the upper limit during the high load."

The above-mentioned loads on the fuel cell 2 can be categorized as follows based on, for example, the amount of power generation required from the fuel cell 2: if the amount of power generation required from the fuel cell is 50% or lower of the allowable amount of power generation of the fuel cell, the load falls under a low load; if the amount of power generation required from the fuel cell is in the range between 30 and 80% of the allowable amount of power generation of the fuel cell 2, the load falls under a middle load; and if the amount of power generation required from the fuel cell is 60% or higher of the allowable amount of power generation of the fuel cell 2, the load falls under a high load.

The control unit 5 physically includes, for example: a CPU; a ROM that stores a control program and control data which are processed by the CPU; a RAM primarily used as various work areas for control processing; and an input-output interface. These elements are connected to each other via a bus. The input-output interface is connected to various sensors such as the pressure sensors P1 and P2, as well as various drivers for driving the compressor 30, the pressure regulating valve 44, the hydrogen pump 46 and the gas-and-water purge valve 49.

The CPU controls, for example, the pressure increase control for the hydrogen-off gas by receiving detection results from various sensors via the input-output interface and processing the received detection results using various pieces of data, etc., in the RAM, based on the control program stored in the ROM. Also, the CPU controls the entire fuel cell system 1 by outputting control signals to various drivers via the input-output interface.

As described above, according to the present embodiment, in the fuel cell system 1 which has the hydrogen pump 46 in the hydrogen circulation flow path 42 and has the ejector 45 at the point of merge, downstream the hydrogen pump 46, between the hydrogen circulation flow path 42 and the hydrogen supply flow path 41, when the pressure of the hydrogen-off gas is increased by the ejector 45 and the hydrogen pump 46, the pressure increase of the hydrogen off-gas can be controlled in accordance with a predetermined pressure increase ratio. With such a configuration, the pressure of the hydrogen gas to be supplied to the ejector 45 and the pressure increase of the hydrogen-off gas realized by the hydrogen pump 46 can be controlled so that the value of pressure increase of the hydrogen-off gas realized by the ejector 45 is 0 or higher.

Accordingly, since the pressure of the hydrogen-off gas can be prevented from being reduced by the ejector 45, a part of the pressure of the hydrogen-off gas which has been increased by the hydrogen pump 46 will not be lost in the ejector 45, and therefore the pressure of the hydrogen-off gas can be efficiently increased by the ejector 45 and the hydrogen pump 46.

Since there is no need for providing an additional flow path such as a bypass flow path, the configuration of the fuel cell system 1 can be simplified.

Note that, although the loads on the fuel cell are categorized in accordance with the amount of power generation required from the fuel cell in the above embodiment, the factor used for categorizing the loads is not limited to the amount of required power generation. For example, the loads on the fuel cell may be categorized in accordance with the output current of the fuel cell, the amount of reaction gas, etc.

Although the above embodiment has been described using the ejector having a constant nozzle diameter, the ejector is not limited to the one having a constant nozzle diameter. For example, an ejector having a nozzle diameter which is variable in accordance with the position of a needle. However, the use of the ejector having a constant nozzle diameter allows the system a simpler configuration.

Although the above embodiment has been described based on the situation where the fuel cell system according to the present invention is mounted in the fuel cell hybrid vehicle, the fuel cell system according to the present invention may also be applied to various mobile objects (robots, ships, airplanes, etc.), in addition to the fuel cell hybrid vehicle. Also, the fuel cell system according to the present invention may be applied to stationary power supply systems used as power generation facilities for constructions (houses, buildings, etc.).

INDUSTRIAL APPLICABILITY

The fuel cell system according to the present invention is, in fuel cell systems having an ejector downstream a fuel pump, suitable for efficiently increasing the pressure of a fuel-off gas with a simple configuration.

Description of Reference Numerals
1 . . . fuel cell system, 2 . . . fuel cell, 3 . . . oxidant gas piping system, 4 . . . hydrogen gas piping system, 5 . . . control unit, 40 . . . hydrogen tank, 41 . . . hydrogen supply flow path, 42 . . . hydrogen circulation flow path, 44 . . . pressure regulating valve, 45 . . . ejector, and 46 . . . hydrogen pump

What is claimed is:
1. A fuel cell system, comprising:
a fuel cell that is supplied with an oxidant gas and a fuel gas as reactant gas and generates electrical power through an electrochemical reaction between the reactant gas;

a fuel supply flow path that supplies the fuel gas from a fuel supply source to the fuel cell;

an ejector that is provided in the fuel supply flow path, the ejector merging the fuel gas supplied from the fuel supply source with a fuel-off gas exhausted from the fuel cell and supplying the resulting gases to fuel cell;

a pressure regulating valve that is provided upstream the ejector in the fuel supply flow path, the pressure regulating valve regulating a pressure of the fuel gas to be supplied to the ejector;

a fuel circulation flow path that returns the fuel-off gas to the fuel gas supply flow path via the ejector;

a fuel pump that is provided in the fuel circulation flow path, the fuel pump pressurizing the fuel-off gas in the fuel circulation flow path and sending the fuel-off gas toward the fuel supply flow path; and a control unit that includes a setting unit, the control unit programmed to control the setting unit to set a pressure increase ratio between the ejector and the fuel pump with respect to a value of a required pressure increase of the fuel-off gas in a memory so as to be within a range which can ensure that the value of pressure increase of the fuel-off gas realized by the injector is higher than 0 in all load regions of the fuel cell, wherein the control unit that is programmed to control, when a pressure of the fuel-off gas in the fuel circulation flow path is increased by the ejector and the fuel pump, a pressure of the fuel gas to be supplied to the ejector and a pressure increase of the fuel-off gas realized by the fuel pump so that a value of the pressure increase of the fuel-off gas realized by the ejector is higher than 0, and in accordance with a pressure increase ratio between the ejector and the fuel pump with respect to a value of a required pressure increase of the fuel-off gas.

2. The fuel cell system according to claim 1, wherein a lower limit of the range has a relationship of: the lower limit value when the operation state of the fuel cell is a first load state<the lower limit value when the operation state of the fuel cell is a second load state<the lower limit value when the operation state of the fuel cell is a third load state.

3. The fuel cell system according to claim 1, wherein an upper limit of the range has a relationship of: the upper limit value when the operation state of the fuel cell is a first load state<the upper limit value when the operation state of the fuel cell is a second load state<the upper limit value when the operation state of the fuel cell is a third load state.

4. The fuel cell system according to claim 1, wherein the range is a range where the pressure increase ratio of the ejector is 50% or lower when the operation state of the fuel cell is the first load state, the predetermined range is a range where the pressure increase ratio of the ejector is between 20 and 75% when the operation state of the fuel cell is the second load state which has a higher load than the first load state, and the predetermined range is a range where the pressure increase ratio of the ejector is 40% or higher when the operation state of the fuel cell is the third load state which has a higher load than the second load state.

5. The fuel cell system according to claim 2, wherein the first load state is a load state where an amount of power generation required from the fuel cell is 50% or lower of an amount of allowable power generation of the fuel cell, the second load state is a load state where the amount of power generation required from the fuel cell is between 30 and 80% of the amount of allowable power generation of the fuel cell, and the third load state is a load state where an amount of power generation required from the fuel cell is 60% or higher of the amount of allowable power generation of the fuel cell.

6. The fuel cell system according to claim 1, wherein the ejector is an ejector having a constant nozzle diameter.

7. The fuel cell system according to claim 3, wherein the first load state is a load state where an amount of power generation required from the fuel cell is 50% or lower of an amount of allowable power generation of the fuel cell, the second load state is a load state where the amount of power generation required from the fuel cell is between 30 and 80% of the amount of allowable power generation of the fuel cell, and the third load state is a load state where an amount of power generation required from the fuel cell is 60% or higher of the amount of allowable power generation of the fuel cell.

8. The fuel cell system according to claim 4, wherein the first load state is a load state where an amount of power generation required from the fuel cell is 50% or lower of an amount of allowable power generation of the fuel cell, the second load state is a load state where the amount of power generation required from the fuel cell is between 30 and 80% of the amount of allowable power generation of the fuel cell, and the third load state is a load state where an amount of power generation required from the fuel cell is 60% or higher of the amount of allowable power generation of the fuel cell.

* * * * *